United States Patent
Bullwinkle et al.

(10) Patent No.: US 7,522,816 B2
(45) Date of Patent: Apr. 21, 2009

(54) METHOD AND APPARATUS FOR NAVIGATING CONTENT IN A PERSONAL VIDEO RECORDER

(75) Inventors: Richard Bullwinkle, Palo Alto, CA (US); Mark Goodwin, Mountain View, CA (US); David Westerhoff, Fremont, CA (US); Adam Briggs, San Francisco, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 814 days.

(21) Appl. No.: 10/918,721

(22) Filed: Aug. 12, 2004
(Under 37 CFR 1.47)

(65) Prior Publication Data
US 2005/0196153 A1 Sep. 8, 2005

Related U.S. Application Data

(60) Provisional application No. 60/494,743, filed on Aug. 12, 2003.

(51) Int. Cl.
*H04N 5/91* (2006.01)

(52) U.S. Cl. ............................. 386/83; 386/46; 386/95; 386/124; 725/110

(58) Field of Classification Search .................. 386/35, 386/40, 46, 95, 83, 124; 725/110, 131, 132, 725/139, 140, 151
See application file for complete search history.

(56) References Cited

U.S. PATENT DOCUMENTS

| | | | | |
|---|---|---|---|---|
| 5,122,886 A | * | 6/1992 | Tanaka | ........................ 358/335 |
| 5,999,688 A | * | 12/1999 | Iggulden et al. | ................ 386/46 |
| 6,920,093 B2 | * | 7/2005 | Nishigaki | ................. 369/44.32 |
| 2002/0083440 A1 | * | 6/2002 | Dupuis et al. | |
| 2003/0031455 A1 | * | 2/2003 | Sagar | ........................... 386/35 |
| 2003/0202773 A1 | * | 10/2003 | Dow et al. | ..................... 386/46 |
| 2004/0221311 A1 | * | 11/2004 | Dow et al. | ...................... 725/52 |

FOREIGN PATENT DOCUMENTS

| | | |
|---|---|---|
| EP | 1 134 975 A2 | 9/2001 |
| WO | 00/07367 | 2/2000 |

OTHER PUBLICATIONS

Supplementary European Search Report, Application No. EP04781021, dated May 9, 2007.
International Search Report for PCT/US04/26269 dated May 23, 2005.*

* cited by examiner

*Primary Examiner*—Thai Tran
*Assistant Examiner*—Mishawn Dunn
(74) *Attorney, Agent, or Firm*—McDonnell Boehnen Hulbert & Berghoff LLP

(57) ABSTRACT

A method and system for navigating content in a personal video recorder ("PVR") is disclosed. The PVR detects events, or dark frames, during recording of television content, and records the locations of the events. The PVR can use the recorded locations of the events by applying commercial grouping rules, contained in a logic that is accessible by a processing unit, to divide the recorded television program into scenes. In applying such commercial grouping rules, a group of back-to-back television commercials comprises a single scene. Such division allows a user to skip over an entire scene (e.g. an entire block of commercials) with the press of a single navigation button.

28 Claims, 10 Drawing Sheets

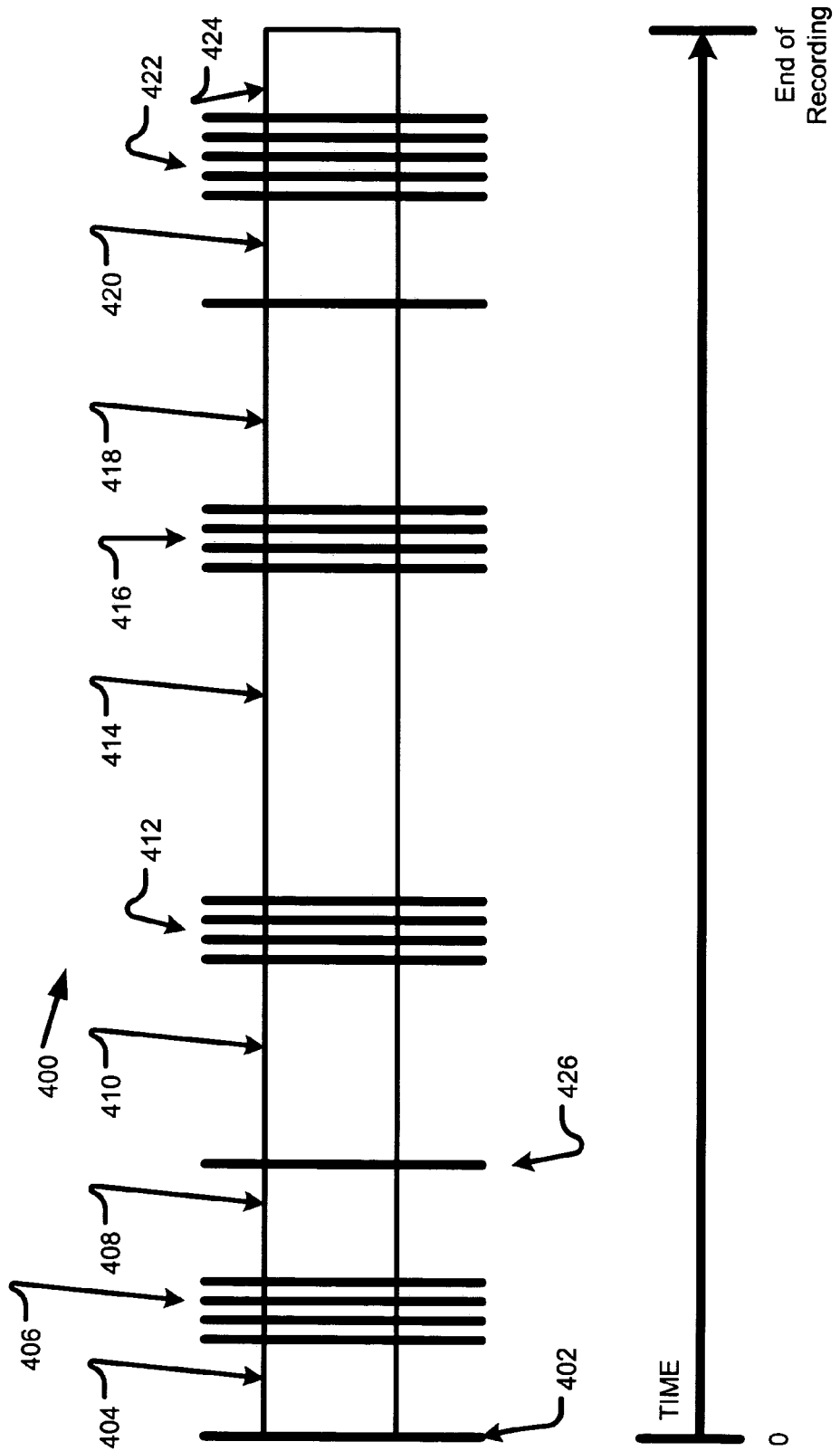

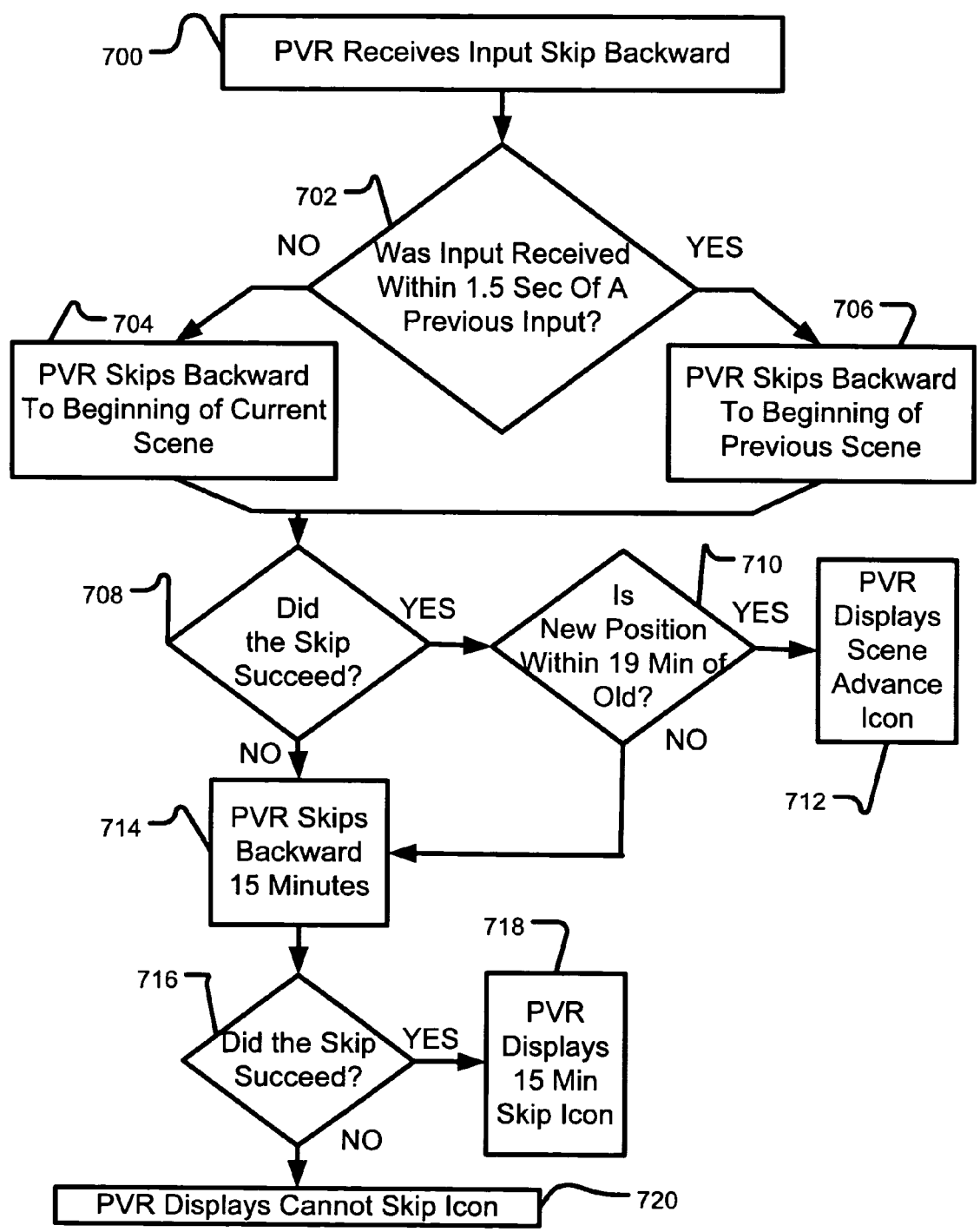

METHOD AND APPARATUS FOR NAVIGATING CONTENT IN A PERSONAL VIDEO RECORDER

CROSS REFERENCE TO RELATED APPLICATION

This application claims the benefit of U.S. Provisional Application No. 60/494,743, filed on Aug. 12, 2003, titled "Method and Apparatus for Navigating Content in a Personal Video Recorder."

FIELD OF THE INVENTION

The current invention relates in general to entertainment devices and, more particularly, to systems and methods for controlling the display of content on a personal video recorder.

BACKGROUND

Personal video recorders ("PVR") typically digitally record television content that is received via broadcast, cable, or satellite. PVRs typically record content according to the user's instructions and preferences. PVRs generally have control buttons on a PVR control panel and/or a remote control to provide the user with the ability to select recorded content that the user would like to view, as well as to move forward or backward through such content during playback.

Recently, PVRs have provided the users with features that give the user the option to either view or navigate through content, including commercial advertisements that are typically broadcast in several groups of time during television programming content. These viewing and navigation features have been implemented in PVRs to allow a user to skip through recorded content in timed intervals. For example, in a typical PVR, pressing a forward, or right navigation button ("RNB"), might cause the content to advance 1.5 seconds or 8 seconds, depending on the type of PVR and/or its settings.

The capability of a PVR to allow a user to skip through recorded content in timed intervals assists the user, if they choose, in jumping past content that the user does not wish to view. This ability to skip through unwanted content allows users to reduce the amount of time spent watching unwanted content (e.g., commercial advertisements), and to reach content that the user does wish to view (i.e., program content) more quickly. However, because this current capability uses time segments to allow the user to skip through the unwanted television content, and because time groups of commercial advertisements are not always the same length, to skip through commercial advertisements, the user must either (1) repeatedly press a forward navigation button (RNB) or (2) press a forward navigation button (RNB) at least once to skip over at least all of the commercial advertisement time segment, and then press a backward button (left navigation button ("LNB")) at least once so to not miss any desired program content.

It would therefore be desirable for a PVR to be able to determine whether sections of recorded content are commercial advertisements or program content, and use such information to divide the recorded content into scenes. A PVR with such a capability may allow a user to skip recorded commercial advertising, for instance, by pressing a single button, without also skipping any program content. For example, it would be desirable to allow a user to skip from scene to scene within recorded content, rather than from a first time segment to a second time segment.

SUMMARY

A PVR having improved content navigation capabilities is disclosed. The PVR includes a processing unit; a first communication interface; a second communication interface; data storage; recorded program data stored in the data storage, the recorded-program data defining a recording of a television program; event data stored in the data storage, the event data defining a plurality of events, and for each event, a corresponding time; index data stored in the data storage, the index data defining the corresponding time for each event and a key frame byte offset for each corresponding time; and playback logic accessible by the processing unit (i) to determine whether an event has occurred, (ii) to divide recorded program data into scenes, and (iii) to skip over at least part of at least one scene in response to a command from a user.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanying drawings in which:

FIG. 4 is a block diagram of a program recorded in a PVR in accordance with an exemplary embodiment;

FIG. 7 is a flowchart depicting an exemplary skip backward operation of a PVR in accordance with an exemplary embodiment.

DETAILED DESCRIPTION OF AN EXEMPLARY EMBODIMENT

In the following detailed description, specific details are set forth in order to provide a thorough understanding of the invention. However, it will be understood that the present invention may be practiced without these specific details. In other instances, well-known methods, procedures, components, and circuits have not been described in detail, so as not to obscure the present invention.

Furthermore, additional implementation details for features described below may be found in the following pending patent applications and issued patents, all of which are incorporated herein by reference:

"System and Method for Indexing Commercials in a Video Presentation," patent app. Ser. No. 10/133,184, Apr. 26, 2002;

"System and Method for Navigation of Indexed Video Content," Ser. No. 10/393,599 Mar. 20, 2003;

"Method & Apparatus For Eliminating Television Commercial Messages," U.S. Pat. No. 5,987,210, filed Dec. 15, 1996;

"Method And Apparatus For Controlling A Video Player To Automatically Locate A Segment Of A Recorded Program," U.S. Pat. No. 5,999,688, filed Aug. 13, 1996;

"Method & Apparatus For Eliminating Television Commercial Messages," U.S. Pat. No. 5,692,093, filed Jan. 4, 1994; and "Method & Apparatus For Eliminating Television Commercial Messages," U.S. Pat. No. 5,696,866, filed Sep. 12, 1994.

1. Exemplary Architecture

Figure 1:
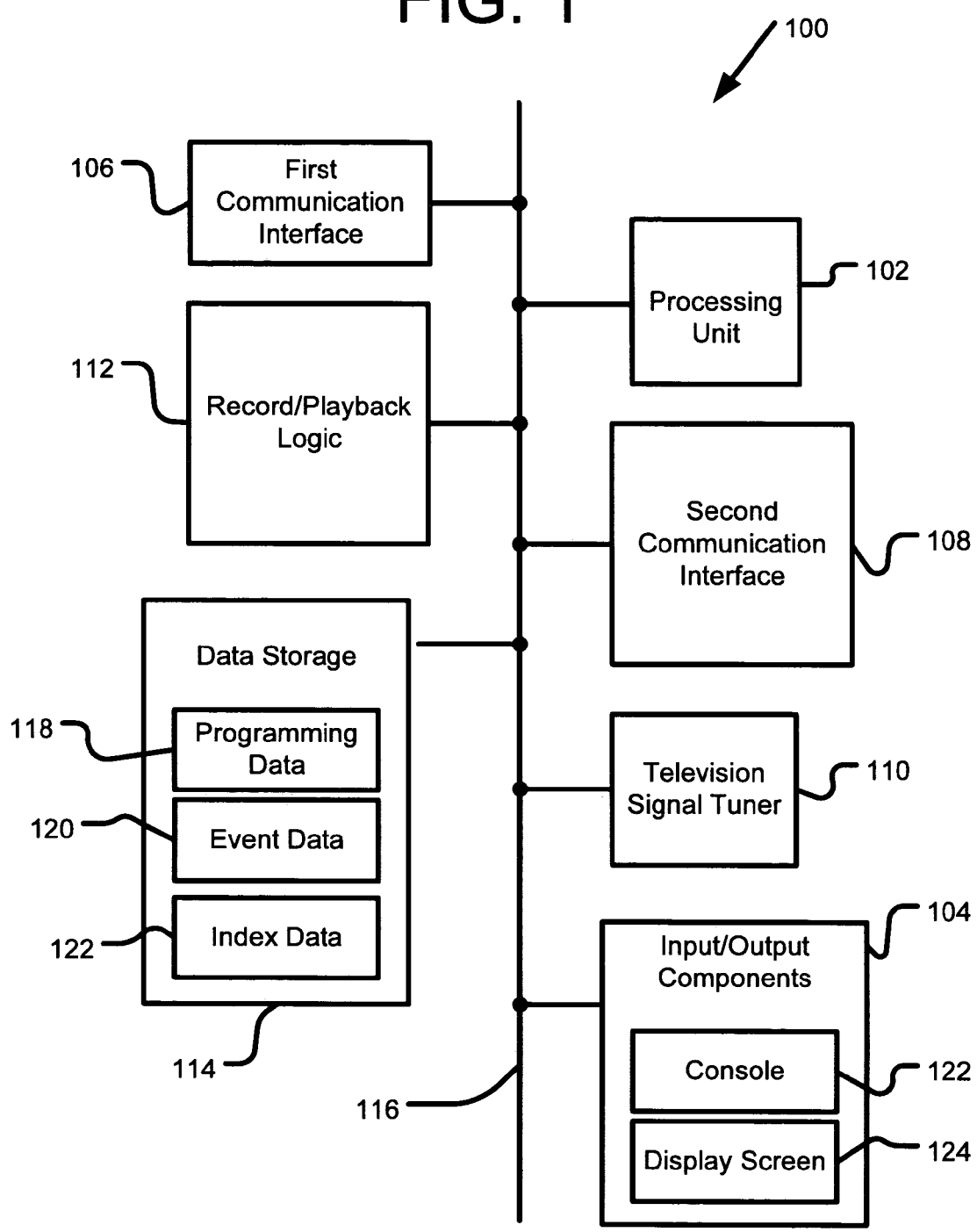
FIG. 1 is a block diagram depicting a PVR in accordance with an exemplary embodiment.

Referring to the drawings, FIG. 1 is a block diagram illustrating components of a PVR 100 for use with an exemplary embodiment of the present application. As illustrated, the PVR 100 may include a processing unit 102, input/output components 104, a first communication interface 106, a second communication interface 108, a television signal tuner 110, playback/record logic 112 accessible by the processing unit 102, and data storage 114—all coupled to a bus 116 or similar mechanism. In one exemplary embodiment, the data storage 114 may store data, including programming data 118, event data 120, and index data 122. More or fewer components are possible for the PVR 100.

The processing unit 102 could be one or more processors, such as a general-purpose processor and/or a digital signal processor. Other types of processors are also possible for use with the PVR 100.

Data storage 114 may be any medium or media readable by the PVR 100, such as magnetic discs, optical discs, and/or any other volatile or non-volatile mass storage system. The data storage 114 may store data, including the programming data 118, event data 120, and index data 122, and/or machine-readable instructions.

The programming data 118 may define a video file, preferably encoded in MPEG format, containing a recording of the content contained in a received program signal. Other types of video formats are also possible for the video file.

The event data 120 may define a plurality of events and, for each event, a corresponding time. The event data 120 is preferably contained in a text file or a table. An example of such a table for event data 120 is shown below in Table 1:

TABLE 1

| Event | Time |
|-------|------|
| 1     | 0    |
| 2     | A    |
| 3     | B    |

As shown in Table 1, the event data 120 may be contained in a table having a first column containing event identifiers and a second column containing times corresponding to the event identifiers. The times could be in second or tenths of seconds, for instance. Other and/or additional information could be contained in the event data 120 and its related text file or table.

The index data 122 may define a plurality of times corresponding to the times of the event data 120 and, for each time, a corresponding byte offset. The byte offset information defines the location of the closest key frame (e.g., an I-frame for MPEG encoded content) in the programming data 118 in relation to the corresponding time. As is known in the art, key frames are fully encoded frames in a video stream (e.g., I-frames are fully encoded frames in an MPEG video stream). The index data 122 is preferably contained in a text file or a table. An example of such a table for index data 122 is shown below in Table 2:

TABLE 2

| Time | Byte Offset |
|------|-------------|
| 0    | N0          |
| A    | N1          |
| B    | N2          |

As shown in Table 2, the index data 122 may be contained in a table having a first column containing times corresponding to the times in the event data 120 and a second column containing byte offsets corresponding to the times. The times could be in seconds or tenths of seconds, for instance. Other and/or additional information could be contained in the event data 122 and its related text file or table.

The input/output components 104 of the PVR 100 can facilitate interaction with a user of the PVR 100 and allow the user to select PVR settings, select content to be recorded, select content to play back, navigate backward and forward through content during playback, and select content to be deleted, for instance. As such, the input/output components 104 might include a console 122 with at least one button or dial and/or a remote control with at least one button as input mechanisms, and a display screen 124 as an output mechanism, for instance. The device 100 might also comprise other and/or additional or fewer input and/or output components than those shown in FIG. 1.

The first and second communication interfaces 106, 108 of the PVR 100 can facilitate communication of the PVR 100 with a television signal network and a television, respectively. The first communication interface 106 allows the PVR 100 to communicate with a television signal network, such as a cable, satellite, or broadcast network, for instance. The PVR 100 may receive television signals from such networks via the first communication interface 106. The second communication interface 108 allows the PVR 100 to communicate with a television in order to facilitate playback of recorded video and/or display on-screen menus associated with the PVR 100, for instance.

The television signal tuner 110 is well known in the art and allows the PVR 100 to decode the television signals that it receives from television signal networks via the first communication interface 106. In an alternative embodiment, the television signal tuner 110 could be external to the PVR 100.

The record/playback logic 112 may contain instructions for (i) recording television content, (ii) detecting events during recording, (iii) recording information regarding time and byte offset corresponding to the detected events, (iv) and interpreting the information regarding time and byte offset corresponding to the detected events in order to allow a user to more easily navigate between scenes of the recorded content. The record/playback logic 112 may alternatively contain other and/or additional or fewer instructions than those mentioned herein. The record/playback logic 112 is preferably implemented in hardware or, alternatively, may be stored in the data storage 114 as computer instructions that are executable by the processing unit 102 (e.g., software).

Figure 2:
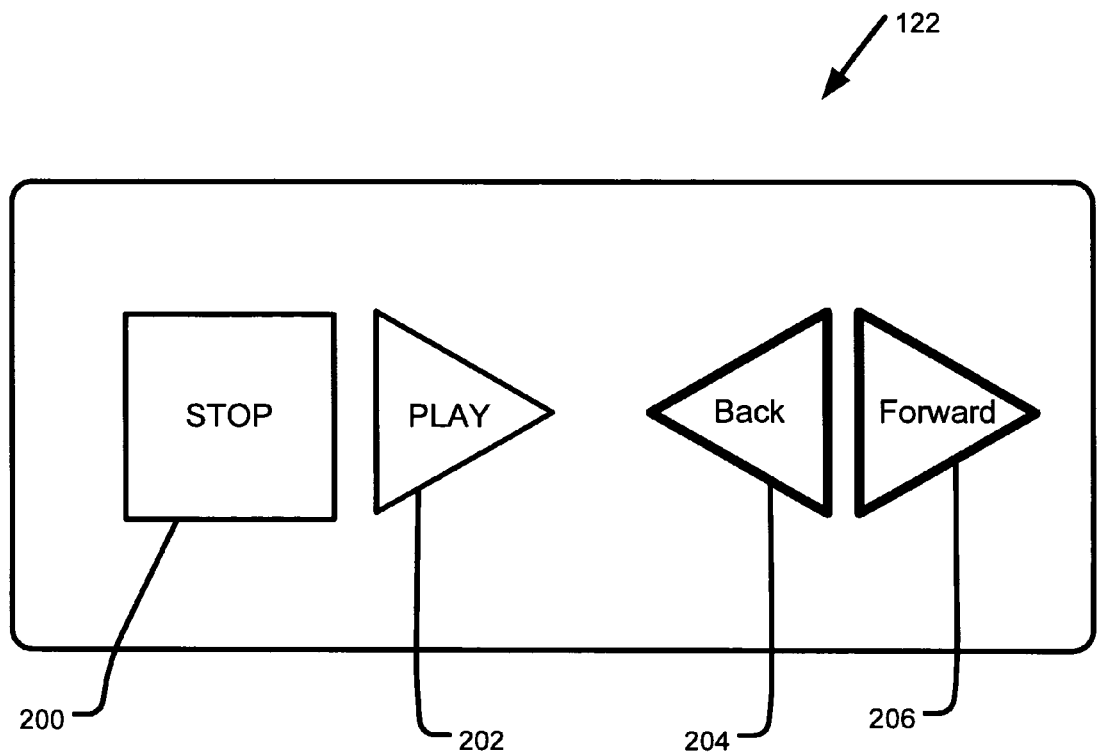
FIG. 2 is a block diagram depicting a control panel of a PVR in accordance with an exemplary embodiment.

Referring to FIG. 2, in one exemplary embodiment, the console 122 of the PVR 100 might include a stop button 200 for stopping video playback and/or stopping recording; a play button 202 for beginning video playback; a back button, or LNB 204, for skipping backward through recorded content; and a forward button, or RNB 206, for skipping forward through recorded content. Other and/or additional or fewer buttons are possible on the control panel 122. Additionally, or alternatively, these buttons may be implemented on a remote control that communicates via wires or wirelessly with the PVR 100. The remote control may communicate with the PVR 100 using a variety of methods, including infra-red (IR) and/or radio-frequency (RF) signals.

2. Exemplary Operation

Figure 3:
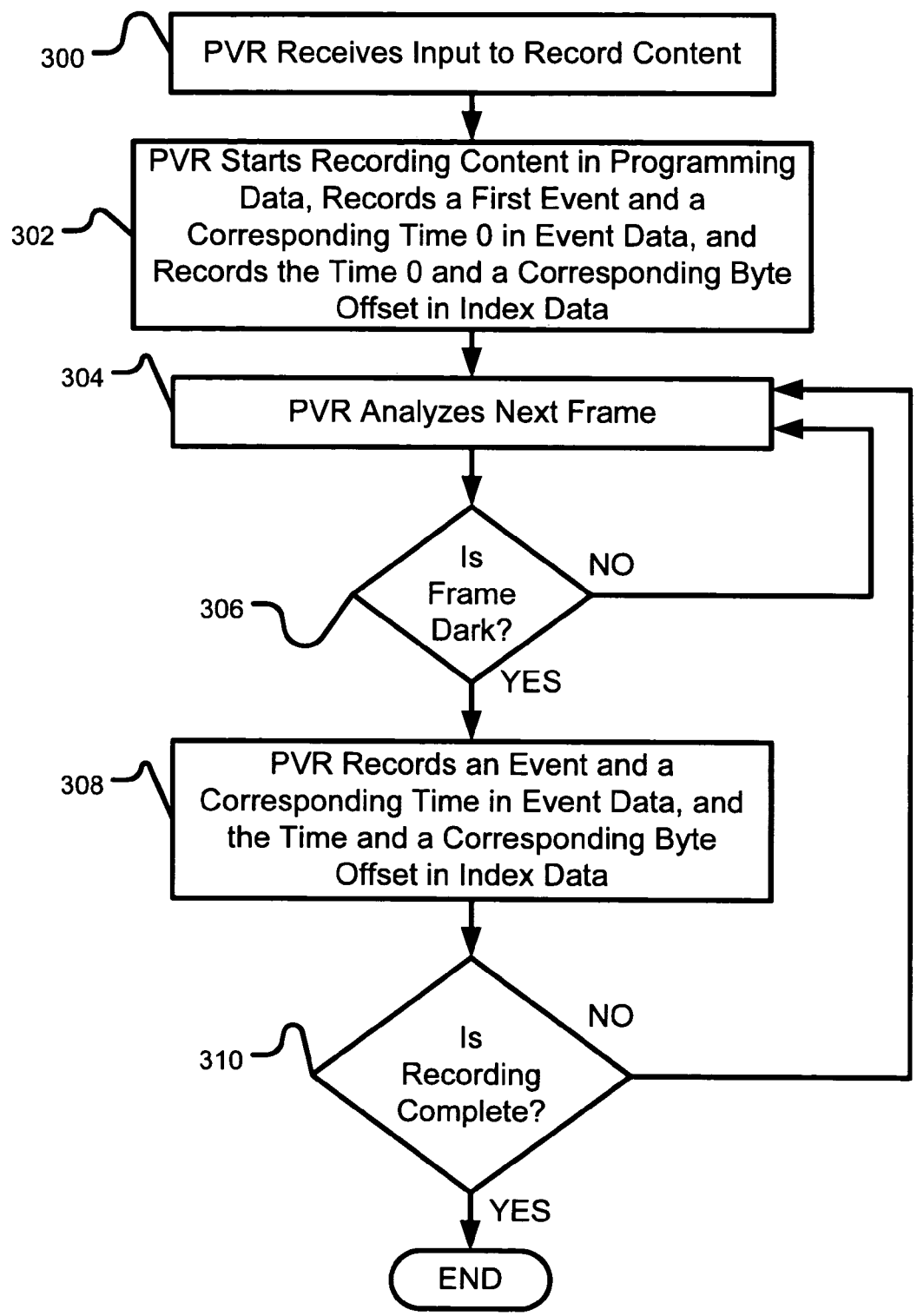
FIG. 3 is a flowchart depicting exemplary operation of a PVR in accordance with an exemplary embodiment.

FIG. 3 is a flow chart that illustrates exemplary functions performed by the PVR 100 in accordance with an exemplary embodiment. At step 300, the PVR 100 receives an input containing instructions from a user to record television content. In response to the input, at step 302, the PVR 100 starts to record television content in accordance with the user's instructions. The PVR 100 receives a television signal via its first communication interface 106 from cable or a satellite dish, for instance, and the PVR's television signal tuner 110 decodes the television signal. Other methods of television signal reception, such as broadcast reception, are possible. The PVR 100 records the television content by storing it in the programming data 118, which in turn is stored in the data storage 114. Additionally, at step 302, the PVR 100 records (1) a first event, representing the beginning of the recording, and a corresponding time 0, in the event data 120, and (2) the same time 0 and a corresponding byte offset (e.g., NO) in the index data 122, both of which are in turn stored in the data storage 114.

After the above information has been recorded in the event data 120 and index data 122, the PVR 100 analyzes the next recorded frame at step 304. If, at step 306, the PVR determines that the next recorded frame is not a dark frame, the process starts again at step 304. In one exemplary embodiment, to determine whether the frame is a dark frame, the PVR 100 divides the frame into at least two fields. These fields can be of similar or different shape and/or size, and can be located in any area of the frame. The PVR 100 may use these fields to determine whether the frame is a dark frame by first building a histogram according to the luminance values of the pixels. The PVR 100 may then define a maximum, or threshold, luminance required for the field to be considered a flat field, which is typically a dark field, signaling an event (e.g., a scene change). The PVR 100 next compares the measured luminance of the field to the threshold luminance for the field. The record/playback logic 112 may contain instructions for measuring and comparing such luminance for the field. In an exemplary embodiment, a dark field may be detected when a majority of the pixels fall in the lowest luminance locations on the histogram, the majority being a number that may be determined according to specific embodiments. In one exemplary embodiment, a majority may be ninety-five percent. Additionally, a dark field may be accompanied by a drop off in sound that the PVR 100 may alternatively and/or additionally detect to determine whether a frame is a dark frame.

If, however, the PVR 100 determines, at step 306, that the frame is dark, the PVR 100 records an event (e.g., a second event) and a corresponding time (e.g., A) in the event data 120, and the time (e.g., A) and a corresponding byte offset (e.g., N1) in the index data 122. Next, at step 310, the PVR 100 determines if the recording is complete. The record/playback logic 112 can contain instructions for performing this step. If the PVR 100 determines that the recording is complete, the process ends. However, if the PVR 100 determines that the recording is not complete, the process begins again at step 304.

In television content a dark field typically signals a change in scene either within the programming content itself, between the programming content and commercial advertisements, or between multiple commercial advertisements. The content between consecutive black fields that are about 30 seconds apart often correlates with a commercial advertisement. For most television programming, commercials are transmitted in groups of two or more between scenes of longer programming content.

FIG. 4 is a block diagram of content (i.e., a program) 400 recorded on a PVR 100 in accordance with an exemplary embodiment. The recorded program 400 shown in FIG. 4 has vertical lines drawn through it at various points, each illustrating the occurrence of an event at that time in the content. As described above, the PVR 100 may record a first event 402, corresponding to the first recorded frame of content 400, at time 0 in the event data 120. Additionally, the PVR 100 may identify events (i.e., dark fields) detected during recording of the program by storing an event identifier and a corresponding time in the event data 120.

During playback, the record/playback logic 112 can divide the program into a series of scenes, based on the locations of recorded events. The recorded program 400 shown in FIG. 4 has been divided into a series of scenes 404-424. These scenes may be comprised of either programming content or commercial advertisement content. Each commercial scene 406, 412, 416, 422 comprises at least one commercial advertisement, and each programming scene 404, 408, 410, 414, 418, 420, 424 defines television show programming. As discussed above, during the recording process the PVR 100 may identify events at locations in the content being recorded and, during playback, the record/playback logic 112 can apply commercial content grouping rules to those events to define scenes within the recorded program 400.

In an exemplary embodiment, the commercial grouping rules may provide that if any event occurs within about 30 seconds of another event, the content between the first such event and the last such consecutive event occurring within about 30 seconds of the previous event is treated as a single scene. This allows a user to skip over an entire commercial segment as a single scene with the press of a single navigation button (i.e., the RNB). As shown in FIG. 4, single, isolated events 426 may be identified within programming content. In such a case, the commercial grouping rules may treat the programming content in which the event is located as either two separate scenes 408, 410, or as an anomaly, an simply ignore the event and treat the two separate scenes 408, 410 as a single scene. Other and/or additional commercial content grouping rules are also possible besides those described herein.

FIGS. 5A-5D depict operation of an exemplary embodiment of a method, implemented in a PVR 100, for providing users with the ability to navigate between different scenes of a recorded program. FIGS. 5A-5D have been divided into scenes in accordance with exemplary commercial grouping rules and the scenes are labeled as either content or commercial blocks. For purposes of illustration, markers, such as the marker at location 502 of FIG. 5A, in the recorded program 500, may define the location of playback of the recorded program 500 at a given time.

Figure 5A:
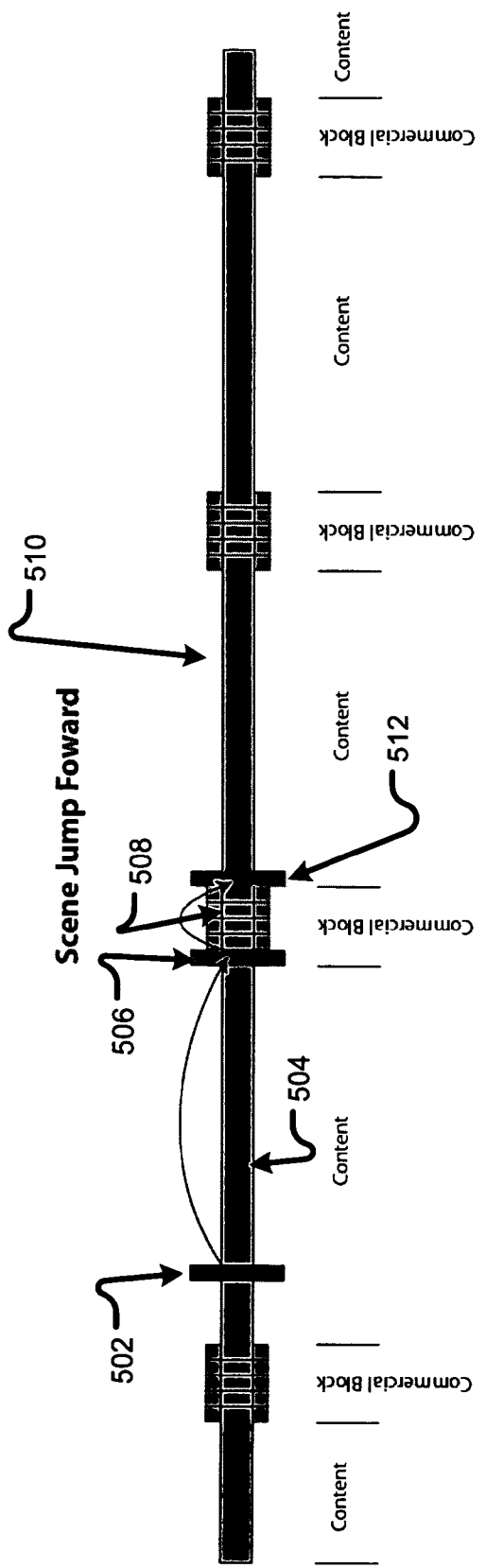
FIGS. 5A-5D are schematic drawings depicting operation of content navigation features that may be implemented in a PVR in accordance with an exemplary embodiment.

FIG. 5A depicts operation of the PVR 100 playing back a recorded program 500 that has been recorded in accordance with an exemplary embodiment. The user can play back the recorded program 500 by selecting the recorded program 500 on the display screen, and then pressing the play button 202 on the control panel 122, for instance. In one exemplary embodiment, the user may navigate through the program 500 by skipping from scene to scene. While playing the recorded program 500, a user may navigate forward to the next scene in the program 500 by pressing the RNB 206. In FIG. 5A, when playback of the recorded program 500 is at location 502 within the second content scene 504 of the program 500, a single press of the RNB 206 causes the PVR 100 to move the playback location ahead in the program 500 to the beginning (i.e., location 506) of the next scene 508. The PVR 100 determines the location in the program to move playback to by referring to the event data 120 for the time of the beginning (location 506) of the next scene 508. The PVR 100 may also refer to the index data 122 for the time and the byte offset of the beginning (location 506) of the next scene 508 to locate the I-frame from which it may begin playing back the scene.

An additional press of the RNB 206 while playback is within the next scene 508 will cause to cause the PVR 100 to move ahead to the beginning (i.e., location 512) of a further next scene 510. As described above, the PVR 100 may access the event data 120 and the index data 122 for the appropriate information that relates to the event that defines the beginning (location 512) of the further next scene 510.

Figure 5B:
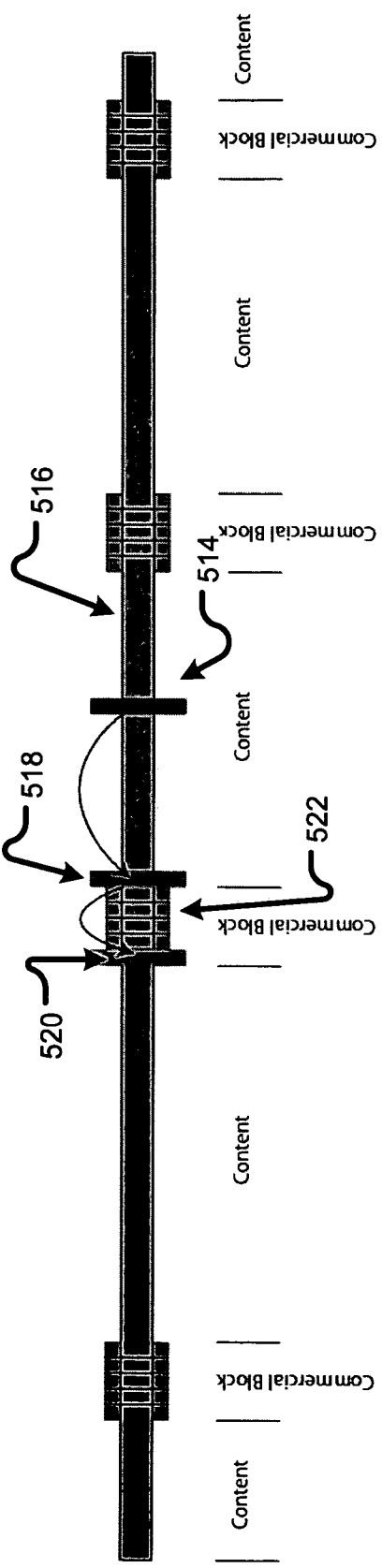

In an exemplary embodiment, the PVR 100 provides navigation in reverse as well. Referring to FIG. 5B, a user press of the LNB 204 when playback of the recorded program 500 is at location 514 within a third content scene 516 causes the PVR 100 to skip back to the beginning (location 518) of the third content scene 516. As described above, the PVR 100 may do this by referencing the event data 120 and index data 122 for information regarding location 518. A subsequent press of the LNB 204 within 1.5 seconds, for instance, of the first press causes the PVR 100 to skip playback to the beginning (location 520) of the previous scene 522.

Figure 5C:
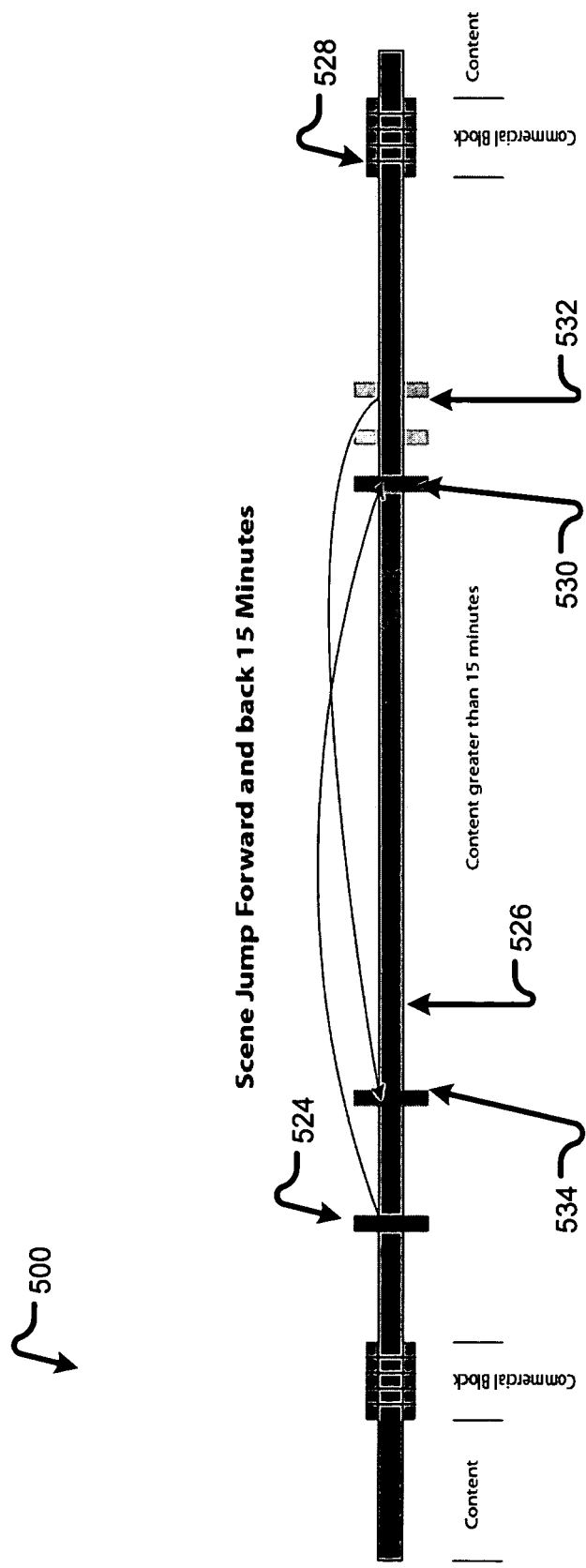

In an exemplary embodiment, the PVR 100 may advantageously skip to different scenes according to timed segments, rather than scenes, when the time between scenes is too great to meaningfully divide the content. Referring to FIG. 5C, when the playback of a recorded program 500 is at location 524 in a current scene 526, the user may press the RNB 206 to skip to the beginning of the next scene 528 after the current scene 526. However, if the beginning of the next scene 528 is 19 minutes, for instance, or more away from the location of playback (i.e., location 524) at the time of the press, the PVR 100 may skip instead to a later location (i.e., location 530) within the current scene 526 (e.g., to a time 15 minutes ahead). Similarly, in FIG. 5C, the user may press the LNB 204 when playback is at location 532 and skip back to an earlier location (i.e., location 534) at a time 15 minutes before location 532 if the beginning of the current scene 526 is more than 19 minutes before location 532.

Figure 5D:
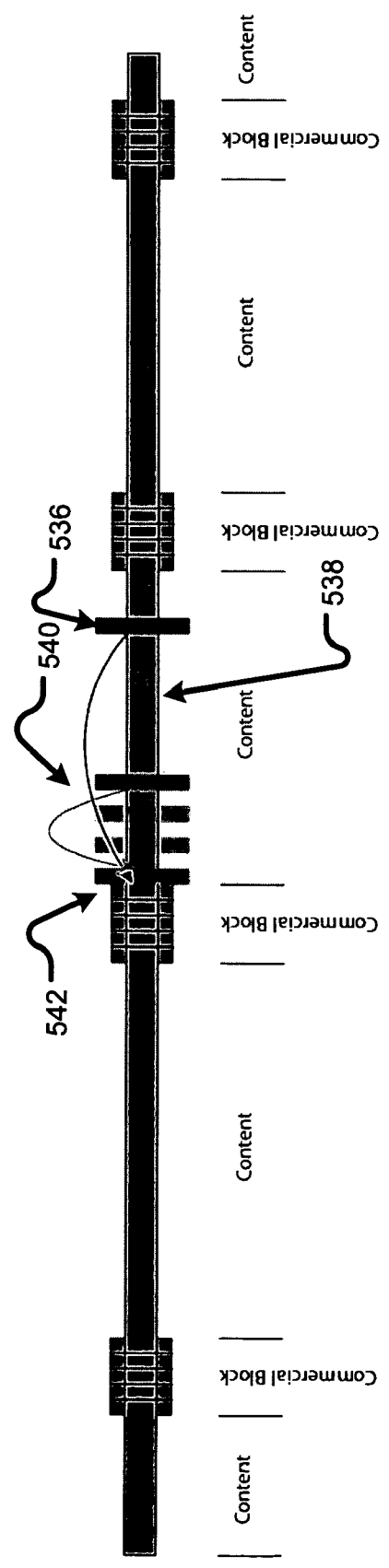

In an alternative embodiment, the PVR 100 may base its selection of where to skip on the time between presses of the navigation buttons 104, 106. Referring to FIG. 5D, the user may press the LNB 204 when the recorded program 500 playback is at location 536 of a current scene 538, and skip back 8 seconds to location 540. However, if the user presses the LNB 204 again within 1.5 seconds, for instance, the PVR 100 will skip playback back to the beginning (i.e., location 542) of the current scene 538.

In further alternative embodiments, other scene advance features may be implemented. For example, a button may be provided to skip in 30 second increments (or some other query time). The PVR may monitor the number of commercial blocks that are skipped in the 30 second increments and determine whether the skip landed within a commercial block. If the skip has landed within a commercial block, the skip may then be adjusted to begin playback at the end of the commercial block, which is the beginning of the next scene.

Figure 6:
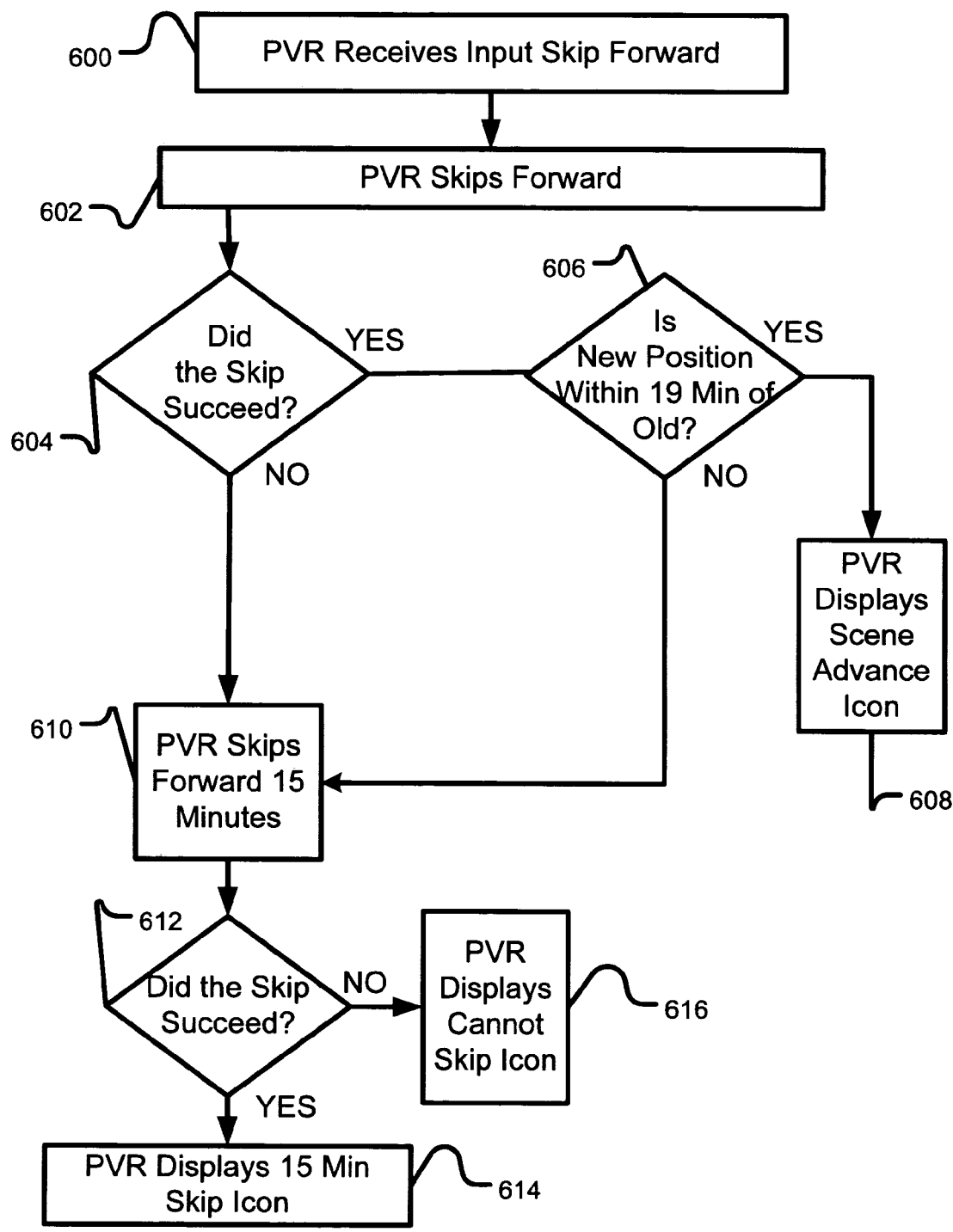
FIG. 6 is a flowchart depicting an exemplary skip forward operation of a PVR in accordance with an exemplary embodiment.

FIG. 6 is a flowchart illustrating exemplary skip forward functions performed by the PVR 100 in accordance with an exemplary embodiment of the present application. At step 600, the PVR 100 receives an instruction to skip forward, or ahead. This occurs by a user pressing the RNB 206 on either the control panel 122 or on the remote control in communication with the PVR 100. In response to receiving the instruction to skip ahead, the PVR 100 attempts, at step 602, to skip forward to a new location in the program, namely at the beginning of the next scene following the one presently playing. At step 604, the PVR 100 determines whether the skip succeeded. The PVR 100 can make this determination by checking whether the new location in the program is the same as the location when the PVR 100 received the instruction to skip ahead. If the skip succeeded, the PVR 100 determines, at step 606, whether the new position location is within 19 minutes of the old location, for instance. The PVR 100 can do this by comparing the time of the new location to the time of the previous location. If the new location is within 19 minutes of the previous location, the PVR 100 displays a scene advance icon, at step 608, alerting the user that he has successfully skipped forward to the next scene.

However, if at step 604 the PVR 100 determines that the skip did not succeed, or if at step 606 the PVR 100 determines that the new location is not within 19 minutes of the old location, the PVR 100 attempts to skip forward 15 minutes from the old position at step 610. This may first require a return to the old location if a skip of 19 minutes or greater has occurred. At step 612, the PVR 100 then determines whether or not the 15 minute skip succeeded. If the skip was successful, at step 614, the PVR 100 displays a 15 minute skip icon to alert the user that the PVR 100 successfully skipped forward 15 minutes. However, if the skip did not succeed, the PVR 100 displays, at step 616, a cannot skip icon to the user alerting the user that the skip was unsuccessful, and continues playing the recorded program from the original location.

FIG. 7 is a flowchart illustrating exemplary skip backward functions performed by the PVR 100 in accordance with an exemplary embodiment of the present application. At step 700, the PVR 100 receives an instruction to skip backward. This occurs by a user pressing the LNB 204 on either the control panel 122 or on the remote control in communication with the PVR 100. In response to receiving the instruction to skip backward, the PVR 100 determines, at step 702, whether the input was received within 1.5 seconds of a previous input. If the PVR 100 does not receive the input within 1.5 seconds of a previous input, the PVR 100, at step 704, attempts to skip backward to a new location, at the beginning of the currently playing scene. However, if the PVR 100 determines at step 702 that the input was received within 1.5 seconds of a previous input, the PVR 100 attempts, at step 706, to skip backward to a new location in the program, namely at the beginning of the scene preceding the one presently playing.

After steps 704 and 706, at step 708, the PVR 100 determines whether the skip succeeded. The PVR 100 can make this determination by checking whether the new location in the program is the same as the previous location. If the skip succeeded, the PVR 100 determines at step 710 whether the new location is within 19 minutes, for instance, of the previous location. The PVR 100 can do this by comparing the time of the new location to the time of the old location. If the new location is within 19 minutes of the old location, the PVR 100 displays a scene advance icon at step 712 alerting the user that he has successfully skipped scenes.

However, if, at step 708, the PVR 100 determines that the skip did not succeed, or at step 710, the PVR 100 determines that the new location is not within 19 minutes of the old location, the PVR 100 attempts to skip backward 15 minutes from the old location at step 714. This may first require a return to the old position if a skip of 19 minutes or greater has occurred. At step 716, the PVR 100 then determines whether or not the 15 minute skip succeeded. If the skip was successful the PVR 100, at step 718, displays a 15 minute skip icon to alert the user that the PVR 100 successfully skipped backward 15 minutes. However, if the skip did not succeed, the PVR 100 displays, at step 720, a cannot skip icon to the user alerting the user that the skip was unsuccessful, and continues playing the recorded program from the previous location.

Exemplary embodiments of the present invention have been described above. Those skilled in the art will understand, however, that changes and modifications may be made to these embodiments without departing from the true scope and spirit of the present invention.

We claim:

1. A personal video recorder ("PVR") comprising:
a processing unit;
a first communication interface;
a second communication interface;
data storage;
recorded program data stored in the data storage, the recorded-program data defining a recording of a television program;
event data stored in the data storage, the event data defining a plurality of events, and for each event, a corresponding time;
index data stored in the data storage, the index data defining the corresponding time for each event and a key frame byte offset for each corresponding time; and
record/playback logic accessible by the processing unit (i) to determine whether an event has occurred, (ii) to divide recorded program data into scenes, (iii) in response to a command from a user at a point in time during a first scene to skip to a next scene, to determine whether the time between the point in time and the next scene is too great to meaningfully divide program content, and (iv) if the time between the point in time and the next scene is too great to meaningfully divide program content, to skip a pre-defined amount of time to a later location within the first scene;
wherein the PVR can receive a television signal via the first communication interface, and wherein the PVR can transmit the recorded signal via the second communication interface to at least one display for viewing by a user.

2. The PVR of claim 1 wherein an event occurs when a dark frame is detected by the PVR.

3. The PVR of claim 2 wherein a dark frame is defined by a majority of pixels having a luminescence below a threshold level.

4. The PVR of claim 3 wherein the majority of pixels is ninety percent.

5. The PVR of claim 1 wherein the record/playback logic is implemented at least one of hardware or software.

6. The PVR of claim 1 wherein the at least one display is at least one of a television, a monitor, a projector, or a handheld display device.

7. The PVR of claim 1 wherein dividing the recorded program data into scenes comprises the step of analyzing the time difference between a plurality of events.

8. The PVR of claim 1, wherein the time between the point and the next scene is too great to meaningfully divide program content if the time is greater than 19 minutes.

9. The PVR of claim 1, wherein the time between the point and the next scene is too great to meaningfully divide program content if the time is greater than 10 minutes.

10. The PVR of claim 1, wherein the pre-defined amount of time is in the range of 5 to 15 minutes.

11. The PVR of claim 1, wherein the record/playback logic is further operable, in response to skipping a pre-defined amount of time to a later location within the first scene, to display a skip icon to the user, wherein the skin icon indicates to the user that a skip of the pre-defined amount of time took place.

12. An entertainment system comprising:
a display; and
a personal video recorder ("PVR") comprising:
a processing unit;
a first communication interface;
data storage;
recorded program data stored in the data storage, the recorded-program data defining a recording of a television program;
event data stored in the data storage, the event data defining a plurality of events, and for each event, a corresponding time;
index data stored in the data storage, the index data defining the corresponding time for each event and a key frame byte offset for each corresponding time; and
record/playback logic accessible by the processing unit (i) to determine whether an event has occurred, (ii) to divide recorded program data into scenes, (iii) in response to a command from a user at a point in time during a first scene to skip to a next scene, to determine whether the time between the point in time and the next scene is too great to meaningfully divide program content, and (iv) if the time between the point in time and the next scene is too great to meaningfully divide program content, to skip a pre-defined amount of time to a later location within the first scene;
wherein the PVR can receive a television signal via the first communication interface, and wherein the PVR can playback the recorded content on the display for viewing by the user.

13. The PVR of claim 12 wherein an event occurs when a dark frame is detected by the PVR.

14. The PVR of claim 13 wherein a dark frame is defined by a majority of pixels having a luminescence below a threshold level.

15. The PVR of claim 14 wherein the majority of pixels is ninety percent.

16. The PVR of claim 12 wherein the record/playback logic is implemented at least one of hardware or software.

17. The PVR of claim 12 wherein the display is at least one of a television, a monitor, a projector, or a handheld display device.

18. The PVR of claim 12 wherein dividing the recorded program data into scenes comprises the step of analyzing the time difference between a plurality of events.

19. A method of navigating content in a personal video recorder ("PVR"), the method comprising:
recording programming content;
determining when at least one event occurs during recording;
recording the occurrence of the at least one event;
playing back the recorded programming content in response to an instruction by a user;
dividing the recorded programming content into scenes based on the at least one recorded event; and
upon receiving a command from a user at a point in time during a first scene. skipping a pre-defined amount of time to a later location within the first scene, if the time between the point and the next scene is too great to meaningfully divide content.

20. The method of claim 19 wherein recording programming content occurs in response to a record input sent to the PVR by a user.

21. The method of claim 19 wherein determining when at least one event occurs comprises detecting a dark frame.

22. The method of claim 21 wherein a dark frame is defined by a majority of pixels having a luminescence below a threshold level.

23. The method of claim 22 wherein the majority of pixels is ninety percent.

24. The method of claim 19 wherein dividing recorded programming content into scenes comprises applying commercial content grouping rules to the at least one recorded event.

25. The method of claim 19 wherein dividing recorded programming content into scenes based on the at least one recorded event comprises defining commercial advertisement scenes.

26. The method of claim 25 wherein commercial advertising scenes are defined by a plurality events occurring about thirty seconds from each other.

27. A personal video recorder ("PVR") comprising:
a processing unit:
a first communication interface;
a second communication interface;
data storage;
recorded program data stored in the data storage. the recorded program data defining a recording of a television program;
event data stored in the data storage. the event data defining a plurality of events, and for each event, a corresponding time;
index data stored in the data storage, the index data defining the corresponding time for each event and a key frame byte offset for each corresponding time; and
record/playback logic accessible by the processing unit (i) to determine whether an event has occurred, (ii) to divide recorded program data into scenes. wherein at least one scene is a commercial block, (iii) in response to a command from a user to skip an increment of time, to determine whether skipping the increment of time would land within a commercial block, and (iv) if the skip of the increment of time would land within a commercial block, to skip to the next scene;
wherein the PVR can receive a television signal via the first communication interface, and wherein the PVR can transmit the recorded signal via the second communication interface to at least one display for viewing by a user.

28. The PVR of claim 27, wherein the increment of time is in a range of 30 seconds to 10 minutes.

* * * * *